United States Patent [19]

Minardi

[11] 3,939,819

[45] Feb. 24, 1976

[54] SOLAR RADIANT ENERGY COLLECTOR

[75] Inventor: John E. Minardi, Kettering, Ohio

[73] Assignee: The University of Dayton, Dayton, Ohio

[22] Filed: Mar. 29, 1974

[21] Appl. No.: 456,177

[52] U.S. Cl. .............................................. 126/271
[51] Int. Cl.² .......................................... F24J 3/02
[58] Field of Search .................................... 126/271

[56] References Cited
UNITED STATES PATENTS

| | | | |
|---|---|---|---|
| 1,747,826 | 2/1930 | Gould | 126/271 |
| 1,951,403 | 3/1934 | Goddard | 126/271 |
| 2,460,482 | 2/1949 | Abbot | 126/271 |
| 2,566,327 | 4/1951 | Hallock | 126/271 |
| 3,107,052 | 10/1963 | Garrison | 126/271 |
| 3,620,206 | 11/1971 | Harris | 126/271 |

Primary Examiner—William E. Wayner
Attorney, Agent, or Firm—Cennamo Kremblas & Foster

[57] ABSTRACT

A solar energy collector having a transparent pane(s) with a flowing "black" liquid medium to absorb the solar energy directly. The specific apparatus comprises in a general embodiment a tubing of various planar configuration to provide a flat surface. Alternative embodiments include the free flow of a black liquid over a flat surface. Other structure is described for heat retention and environmental control. The black liquids have a high rate of absorption to solar energy.

4 Claims, 12 Drawing Figures

SOLAR RADIANT ENERGY COLLECTOR

BACKGROUND

The prior art flat-plate solar energy collectors generally consist of a number of transparent panes and an absorbing surface, the surface in turn is of metal coated with a suitable black absorbing material. A liquid or gas is passed either in front, behind, or around the absorbing surface to extract energy from the absorbing surface. The energy absorbed is then transported by the liquid or gas to the point of application. Suitable insulation is placed behind the collector and along the edges to reduce heat loss. Improvements have been made in the performance of flat-plate collectors by the use of selective black coatings which have a high rate of solar absorption and low infrared emittance. Other improvements include evacuating the gas between the transparent panes and the absorbing surface. In some instances a honeycomb structure is utilized to reduce conduction losses.

Other prior art solar energy absorption systems utilize tubing — but the tubing is either metal or of clear plastic coated with a black absorbing material. In operation these collectors have a nearly uniform temperature over the entire surface; accordingly, being susceptible to radiant heat losses.

SUMMARY OF INVENTION

The present invention comprises configurations wherein the solar radiation is directly absorbed. The metal absorbing surface and/or absorbing coating material are eliminated. In this way the solar energy is directly absorbed in the heat transfer medium. The principal advantage of this type of structure is that the heat losses are lessened since the heat transfer medium is the hottest material in the collector. Also the structure of the embodiments of the present invention provide a gradual elevation of temperature as fluid moves through the collector; only the outlet of the collector is at the maximum temperature. With this structure the radiant heat losses and edge losses are considerably lessened.

The structure of the present invention generally comprises in a first embodiment a clear-transparent tubing of a considerable length wound or folded into a planar surface. The liquid passing through the tubing is a black liquid — a liquid having a high rate of absorption to solar energy.

The preferred embodiment encompasses a closed structure to prevent heat losses from environmental conditions. An alternative embodiment has a sheet of black liquid passing over a reflecting or absorbing surface in an enclosed structure. Data substantiates the intended result of raising the temperature of the liquid to a useful range — even under non-optimum conditions.

OBJECTS

It is accordingly a principal object of the present invention to provide a new and improved solar energy collector wherein the heat transfer intermediate is eliminated.

Another object of the present invention is to provide a solar energy collector that is relatively simple in operation and in actual construction and yet overcomes the prior art disadvantage of heat losses.

Still a further object and other features of the present invention will become apparent from the following detailed description when taken in conjunction with the drawings in which:

DETAILED DESCRIPTION OF INVENTION

Figure 1:
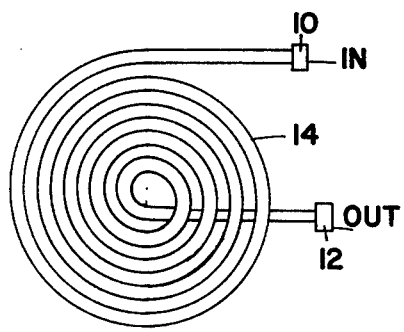
FIGS. 1 and 2 illustrate a first preferred embodiment of the present invention where the tubes are wound in a circular and spiral planar surface.
Figure 2:
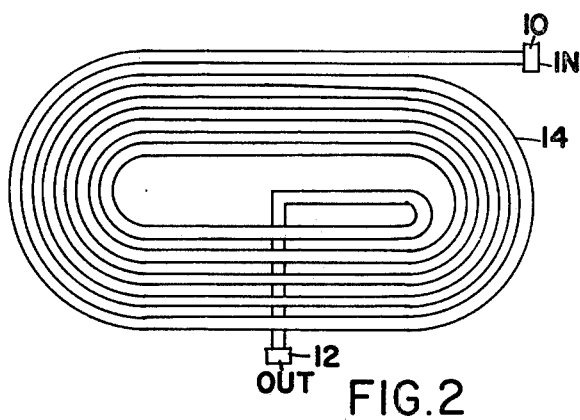
Figure 3:
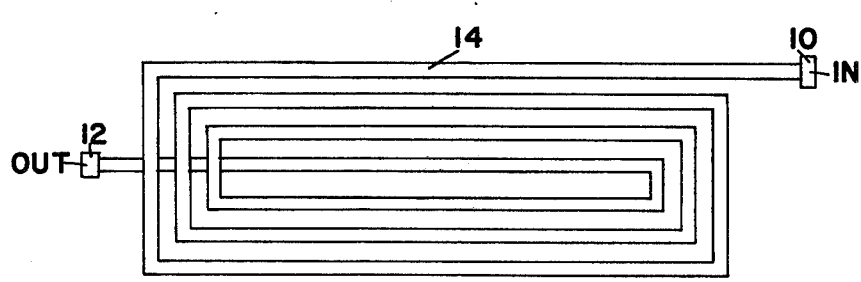
FIG. 3 is that structure of FIG. 1 wound to provide a rectangular planar surface.
Figure 3A:
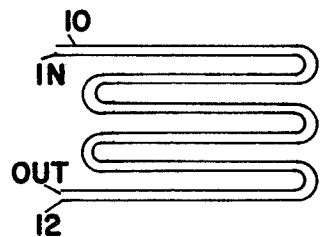
FIGS. 3A, 3B, and 3C is each represents that structure of FIG. 1 wound to provide several alternative zig-zag patterns.
Figure 3B:
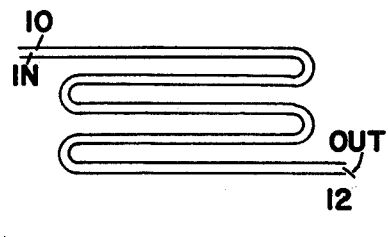
Figure 3C:
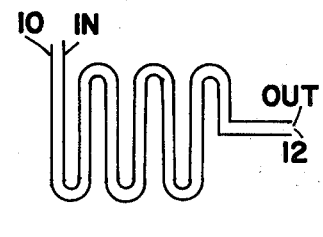

With particular reference to FIGS. 1 through 3 there is illustrated the basic structure of the invention. An elongated tubing 14 of transparent material is wound in a manner for greatest solar exposure — but, yet, covering a minimum overall flat sheet area. In FIG. 1 the tubing 14 is wound in a circular path, in FIG. 2 a curved path, in FIG. 3 a rectangular path and in FIGS. 3A, 3B, and 3C in a back and forth path.

It is appreciated that with each configuration there is a liquid input means 10 and liquid output means 12, such as, couplings.

The tubing 14 is in a preferred embodiment plastic since there are plastic tubings commercially available that can be physically wound. The essential critereon is that the tubing be clean — that is, a minimum amount of radiant energy absorption by the tubing per se.

Equally significant to the transparent tubing 14 is that the liquid passing therethrough is black. The liquid utilized in the invention is the energy collector; accordingly, black is intended to include colloidal suspensions, selective or nonselective black materials such as carbon black, a mixture of colloids, selective or nonselective pure liquid compounds — of single or a mixture of — components, or liquids with dyes or solutes.

In the embodiment of the invention, the need for a metal absorbing surface along with its coating material is eliminated and the solar radiation is directly absorbed in the liquid heat transfer medium. In this way the heat losses are reduced since the liquid heat transfer medium is the hottest material in the collector.

In that the radiant energy collector is the liquid passing through the tubing 14 it can be appreciated that the liquid at the outlet 12 has the maximum exposure time. In this way there is a gradual elevation of temperature as fluid moves from the input 10 through the tubing 14 with the maximum temperature at the outlet 12. This is in contrast to the metal collectors which operate with a more nearly uniform high temperature over their entire surface. The lower surface temperatures reduce the radiant heat losses from the black liquid collector. In addition, edge losses from the collectors would be lower as the entire outside edges of the configurations in FIGS. 1 and 2 would be at the lower temperatures while at least one edge of collectors in FIGS. 3 and 4 would be at the lower temperatures.

Figure 9:
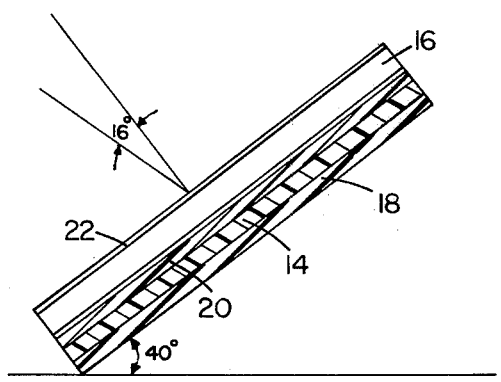
FIG. 9 is a constructed embodiment of the entire system of the invention.

With reference to FIG. 9 there is illustrated a constructed embodiment having an overall liquid collector configuration similar to the schematic of FIG. 1. This embodiment comprised the clear plastic tubing 14 approximately 25 turns.

In this embodiment the tubing had an overall planar arrangement. In this way the tubing was wound but yet retained maximum exposure to solar radiant energy. The tubing 14 was enclosed in a box-like housing 16. The housing 16 in turn providing heat insulation to prevent losses but yet permitting radiation to pass to the tubing 14. The box-like housing 16 had as its base a layer of foam insulation 18; the tubing 14 positioned directly thereon. Placed immediately above the tubing 14 is a sheet of clear plexiglas 20, thereafter an air space and another sheet of clear plexiglas 22.

In the first test, of this embodiment, the black liquid comprised mixing 91 grams of Acheson's Aquadag paste (a dispersion of high purity colloidal graphite in water) with 1 liter distilled water. The fineness, purity and excellent suspension properties of the graphite particles enabled the diluted product to be employed in an extensive range of applications for which large particle size dispersions and graphite powders are unsuitable.

The overall structure was oriented 40° above the horizontal facing magnetic South. The highest liquid temperature achieved in the collector (no flow) during the first test was 185°F at an ambient temperature OF 78°F. The estimated direct solar radiation intensity was at solar noon calculated to be 283 Btu/hr-ft$^2$.

Figure 5:
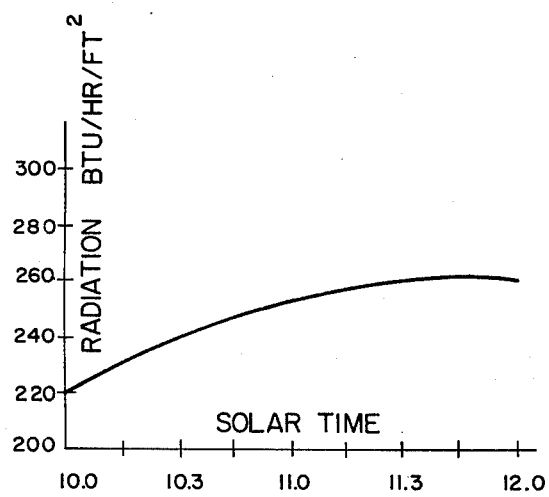

The second test conducted included modifications on the housing structure to provide more efficient insulation and heat retention to reduce heat losses. The highest liquid temperature achieved in the collector (no flow) was 210°F (the boiling point of this black liquid) at an ambient temperature of 36°F. With reference to FIG. 5 the estimated incident solar radiation intensity at solar noon was calculated to be 271 Btu/hr-ft$^2$. The angle of incidence at solar noon was estimated at 16°. This temperature was achieved in about 45 minutes after the collector was exposed to the solar radiation at 10:30 solar time.

With this improved embodiment of FIG. 9 it was concluded that had the black liquid not vaporized, a much higher temperature would have been achieved with this collector.

Figure 7:
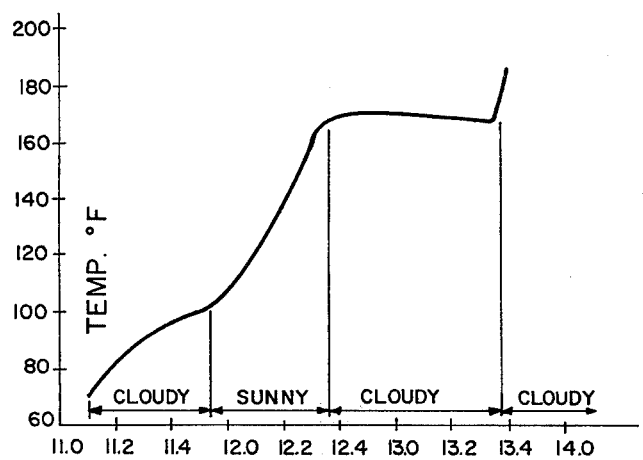
FIGS. 7 and 8 are still other graphical illustrations of solar time versus temperature of the black liquid.

The next test included a glycal ethylene liquid mixed with the black liquid at 3 parts with 1 part of black liquid. This liquid had a boiling point of 260°F. The incident solar radiation intensity at solar noon was calculated at 266 Btu/hr-ft$^2$. The angle of incidence at solar noon was estimated at 18°. Due to cloudy sky and very strong winds, the highest liquid temperature (no flow) achieved in the collector was about 173°F as shown in FIG. 7. However, when flow was initiated in the tubing 14 the liquid temperature was suddenly increased to 190°F. It was reasoned that the thermocouple slipped relative to other components and failed to record the liquid temperature in the coil.

In a fourth test the glycal ethylene liquid was mixed with the black liquid at 3 parts (vol) with 1 part (vol) of black liquid. This liquid has a boiling point of 260°F at 800 feet above sea level. The black liquid was a mixture 91 grams of Acheson's Aquadag paste to 1 liter of distilled water. The calculated incident solar radiation intensity at solar noon was 266 Btu/hr-ft$^2$. The angle of incidence at solar noon was estimated at 18°.

Figure 8:
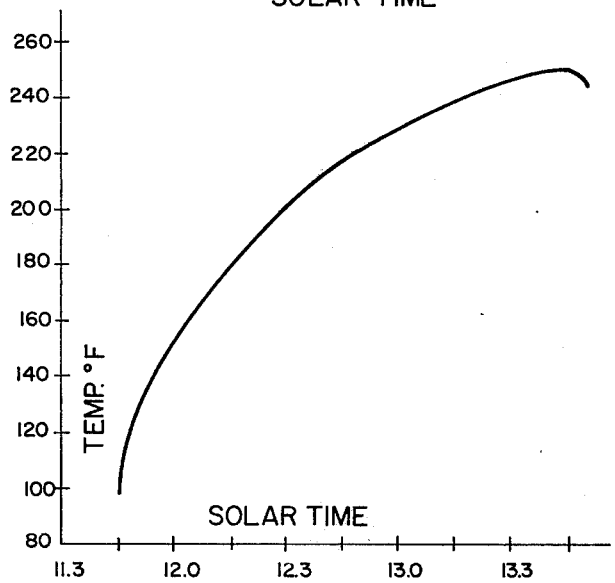
Figure 6:
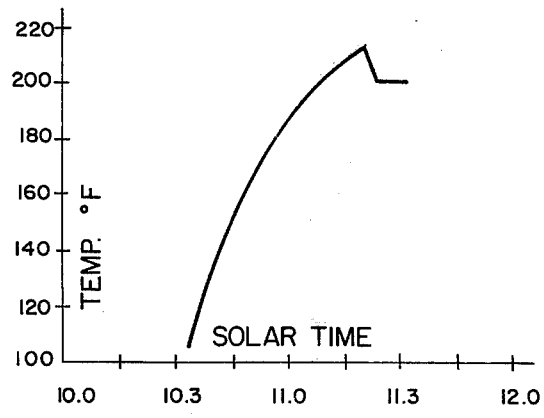
FIGS. 5 and 6 are graphical illustrations of solar time versus calculated radiation and measured temperature of the black liquid.

The highest liquid temperature achieved in the collector (no flow) was 250°F, just about 10°F below the boiling point of this liquid. The test was initiated at 11:45 solar time. It is presumed had the test started earlier, the liquid would have reached its boiling point. Results of this test are illustrated in FIG. 8.

Figure 4:
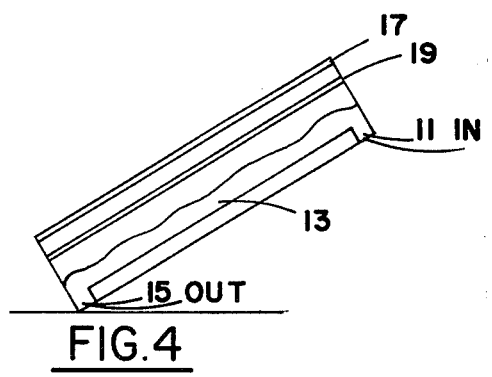
FIG. 4 is a cross sectional view of a constructed embodiment illustrating another alternative structure of liquid flow.

Although FIG. 9 illustrates a preferred embodiment, it is to be understood that modifications may be had without departing from the spirit and scope of the invention, such as, the embodiment of FIG. 4. In this alternative embodiment the coil is eliminated. A liquid flow 13 is entered at input 11 and permitted to flow in a heat absorbing solar relationship before exiting at 15. In this embodiment all losses that may be attributed to the tubing are eliminated.

It is of course understood once the liquid is heated its utilization as an energy source may be utilized.

What is claimed is:

1. A solar radiant energy collector comprising a source of liquid having a medium dispersed therein with a high absorptance to solar energy, a transparent tube of an extended length wound in a configuration to provide a flat-like planar surface for maximum exposure to solar radiant energy, a reflector surface positioned on the opposite side of said planar surface to that exposed to said solar radiant energy a liquid inlet and outlet joined with said transparent tube; and liquid pressure means to cause said liquid to flow from said inlet through said tube and to said outlet.

2. The solar radiant energy collector of claim 1 wherein said reflecting surface is a sheet-like surface in a heat-loss type enclosure.

3. The solar radiant energy collector of claim 1 wherein said medium dispersed in said liquid is a colloidal suspension.

4. The solar radiant energy collector of claim 1 wherein said medium dispersed in said liquid is a carbon black.

* * * * *